United States Patent [19]
Keegan et al.

[11] Patent Number: 5,883,776
[45] Date of Patent: Mar. 16, 1999

[54] APPARATUS AND METHOD FOR IMPROVING RESPONSE TIME OF ELECTROMAGNETIC ACTUATORS

[75] Inventors: Kevin Richard Keegan, Hilton; Daniel Lee Varble, Henrietta, both of N.Y.

[73] Assignee: General Motors Corporation, Detroit, Mich.

[21] Appl. No.: 885,437

[22] Filed: Jun. 30, 1997

[51] Int. Cl.⁶ .................................................. H01H 47/32
[52] U.S. Cl. .......................................... 361/156; 361/159
[58] Field of Search ..................... 361/152–156, 361/159, 160

[56] References Cited

U.S. PATENT DOCUMENTS

| Re. 30,150 | 11/1979 | Puvogel | 361/156 |
| 4,318,154 | 3/1982 | DePuy | 361/155 |
| 4,631,736 | 12/1986 | Yamanoue et al. | 375/71 |

*Primary Examiner*—Fritz Fleming
*Attorney, Agent, or Firm*—Vincent A. Cichosz

[57] ABSTRACT

Inductive energy from the coil of an electromagnetic actuator is stored in capacitive network at a relatively high voltage when the actuator is deenergized. When the actuator is energized, the capacitive network is coupled to the coil thereby releasing the stored energy at a high voltage to the coil.

10 Claims, 2 Drawing Sheets

APPARATUS AND METHOD FOR IMPROVING RESPONSE TIME OF ELECTROMAGNETIC ACTUATORS

TECHNICAL FIELD

The present invention is related to inductive electrical devices.

BACKGROUND OF THE INVENTION

Electrical actuators including motors and solenoids are used in numerous applications to provide controlled translation of mechanical components. All such actuators comprise, in one form or another, at least one electrical coil characterized by inductive and resistive electrical parameters. Mechanical response time of an actuator to energization of the coil, hereafter pull-in response, is often limited by the time required to develop current in the coil since the force acting on the actuator is proportional to the current. Generally, high force generating coils—that is to say solenoid structures characterized by relatively numerous coil turns—have slower current rise times due to the proportional correspondence between coil turns and inductance.

As a practical matter, all systems have a limitation on the source voltage which comprises the forcing function for the current development in accord with natural and forced response characteristics of the energized circuit. For example, in conventional automotive applications, the source voltage and hence the forcing function is substantially 12 volts. The inductive and resistive electrical parameters of the electrical coil together with the source voltage parameter therefore limit the response of the actuator.

Another characteristic of electrical actuators of the inductive variety presents certain challenges for mechanical response of the actuator upon deenergization of the coil. The energy stored in the coil due to the current flowing therethrough while energized requires management to prevent overvoltage damage to solid state drive circuitry and to ensure adequately swift dissipation in applications where minimization of mechanical response time of the actuator to deenergization of the coil, hereafter drop-out response, is an objective of the system. Known techniques for inductive current management include use of anti-parallel diode arrangements for dissipating the inductive energy. Generally, however, faster actuator drop-out response is achieved with faster energy dissipation which, of course, requires robust snubber diode arrangement.

As can be seen, performance shortfalls exist at both ends of an energization cycle for electrical actuators of the inductive variety.

SUMMARY OF THE INVENTION

The present invention is directed toward solving the various shortfalls of inductive actuators. In accordance with the present invention, the rise time of current through an inductive device, and hence pull-in response, are improved by storing the energy from the collapsing magnetic field of a device inductor at the end of an energization cycle into a storage capacitor at a relatively high voltage. The energy in the storage capacitor is then released to the inductor at the beginning of the next energization cycle thus improving the rise time of the current through the inductor and also improving the pull-in response of the mechanical portion of the actuator. The cycle repeats itself during each energization cycle to repetitively recycle the inductive device energy.

In accordance with another aspect of the present invention cumulatively applicable to reduce inherent degradation in drop-out response resulting from the energy storage described, switched capacitance in the storage of energy at the turn off of the inductive device is employed. Sequential charging of relatively small capacitors to relatively high voltages provides the deenergized inductor with a higher apparent voltage and hence faster dissipation of energy from the inductor thus shortening the drop-out response of the actuator in comparison to configurations storing directly to a single, larger capacitor.

DESCRIPTION OF THE PREFERRED EMBODIMENT

Figure 1:
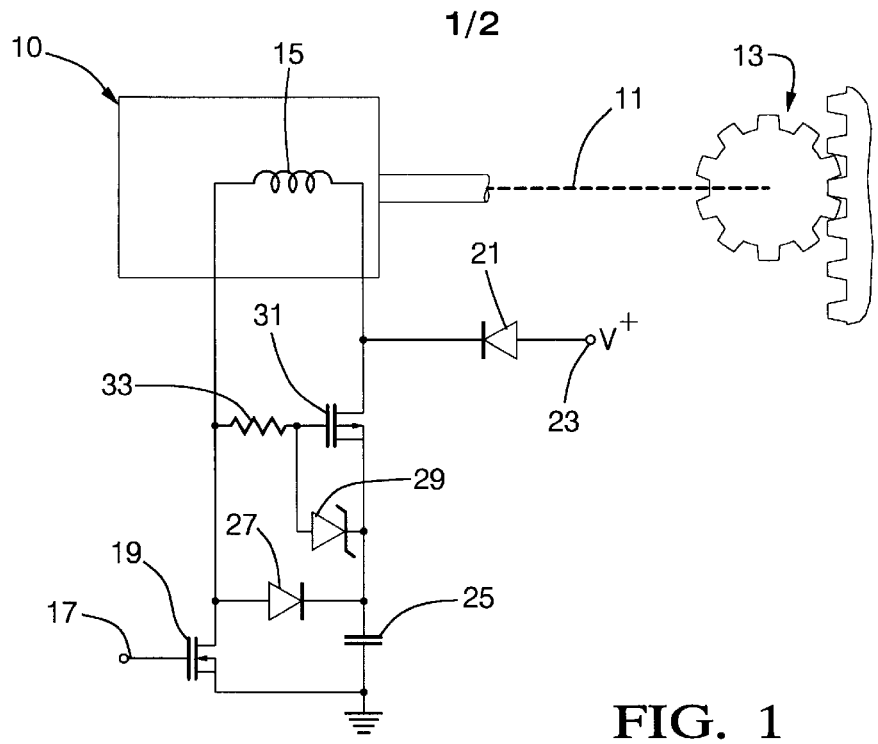
FIG. 1 illustrates a first embodiment of the present invention particularly suited for applications wherein actuator drop-out response is not critical.

With reference to FIG. 1, a first embodiment of the present invention has an inductively driven actuator labeled 10. Actuator 10 is, for example, a conventional permanent magnet DC stepper motor having an output shaft 11 for imparting rotary motion in predetermined stepped increments or angular displacements. The output shaft may be coupled to a mechanism to translate the rotary motion to linear motion. One such mechanization is illustrated in the figure as a convention rack and pinion assembly generally designated by the numeral 13. Such arrangement is typical in certain flow control valves such as, for example, exhaust gas recirculation valves commonly employed in emission control systems on internal combustion engines.

Conventional DC stepper motors are inductive devices well suited for the application of the present invention. Stepper motors typically have two (bipolar) or four (unipolar) stator coils selectively energized to control the angular displacement of the output shaft. In the illustrated embodiment, one coil 15 of a four coil unipolar stepper motor is illustrated. It is to be understood that the remaining three coils not illustrated may likewise be configured as later described in the practice of the present invention. Generally, all coils in a four coil unipolar configured stepper motor would be energized in accordance with well known quadrature drive arrangement employed either through software or hardware implementations.

For purposes of the present description, a control signal, which may be one phase and sense of a conventional quadrature drive arrangement, is provided at control terminal 17. Control terminal 17 is coupled to the gate of an N-channel field effect transistor FET 19. The drain of FET 19 is coupled to the ground end of coil 15. The source of FET 19 is coupled to a common ground which, in automotive applications may represent the negative terminal of a DC electrical supply. The supply end of coil 15 is coupled to the cathode of diode 21. The anode of diode 21 is in turn coupled to the positive terminal of the DC electrical supply V+. In the present embodiment, the DC electrical supply is assumed to be a conventional 12 volt automotive system voltage generally limited to less than approximately 14.5 volts.

The control signal supplied to the control terminal 17 provides high and low logic levels of substantially +5 and 0 volts, respectively. High logic levels provided to the control terminal are effective to bias FET 19 conductive thereby coupling coil 15 to ground. Low logic levels provided to the control terminal are effective to bias FET 19 non-conductive thereby decoupling coil 15 from ground.

Storage capacitor 25 is coupled at one end thereof to ground. The other end of storage capacitor 25 is coupled to the cathode of diode 27, the anode of which is coupled to the drain of FET 19. The cathode of diode 27 is further coupled to the source of P-channel field effect transistor FET 31 and the cathode of Zener diode 29. The anode of Zener diode 29 is coupled to the gate of FET 31 and one end of bias resistor 33. The other end of bias resistor 33 is coupled to the ground side of coil 15, the anode of diode 27 and the drain of FET 19. The drain of FET 31 is coupled to the junction of the supply side of coil 15 and the cathode of diode 21.

In one example, a stepper motor having a coil characterized by a nominal inductance of approximately 50 mH, and a storage capacitor characterized by a nominal capacitance of 0.5 uF and a voltage rating of 150 volts provided the nominal working values of the reactive components in the circuit described above.

The exemplary circuit set forth above operates as follows. Assuming a substantially steady state energization of coil 15 corresponding to a high logic signal at control terminal 17, an amount of energy is understood to be stored in the coil 15. The steady state of the coil is generally understood to mean that the characteristic transient response of the inductor to energization is passed and the current therethrough is substantially stabilized at a value in accord with the forced response of the coil. The amount of energy in this steady state condition is well known to be substantially $\frac{1}{2}*Li^2$ where L is the inductance of the coil 15, and i is the steady state current therethrough. The steady state current may alternately be expressed as v/R where v is the voltage applied across the coil 15 and R is the resistive component of the coil impedance. The value for v in the present example is approximated by supply voltage V+. Additionally, storage capacitor 25 is assumed to be substantially discharged to approximately supply voltage V+. FET 31 is in a biased on condition since the gate thereof is pulled down to substantially ground potential through bias resistor 33 and FET 19, and the source is at substantially supply voltage V+. Therefore, the gate is low with respect to the source and P-channel FET 31 biased on.

Assuming now that the control signal at control terminal 17 is switched to a low logic level, indicating the desirability of device drop-out, FET 19 is biased off. The current through the coil 15 cannot instantaneously change and hence is routed through diode 27 and storage capacitor 25. The voltage across the coil rises as the current therethrough decays and is influenced by the charge acceptance of the storage capacitor 25. Storage capacitors having relatively small capacitance values will exhibit relatively quick voltage rise for a given current. Initially, the voltage at the ground end of the coil 15 rapidly rises to substantially supply voltage as the current therethrough is shunted through diode 27 to storage capacitor 25. Storage capacitor 25 initially clamps the ground end of the inductor to supply voltage and thereafter is charged up to a higher potential in accordance with its capacitance value and the rate of current decay through the coil 15. In a single storage capacitor embodiment as illustrated in FIG. 1, the main considerations in choosing storage capacitance parameters are maximum voltage rating and energy storage capacity sufficient to accommodate the stored inductive energy. As the voltage across storage capacitor 25 rises, Zener diode 29 ensures that the gate voltage is a diode drop above the source thereby rendering FET 31 biased off. At the point where the current through the coil 15 decays to zero, the voltage at the ground end of the coil 15 drops to substantially supply voltage.

The control signal may now be applied to the control terminal 17 at a high logic level to energize the coil 15. The turn-on of FET 19 occasioned by the high logic level control signal pulls the ground end of the coil to ground potential which, as earlier indicated, effectuates the biasing of FET 31 on due to the low gate voltage relative to the source voltage. The storage capacitor 25 is thereby coupled to the supply end of the coil 15 through FET 31. Diode 21 is reverse biased and the voltage across the storage capacitor 25 is thereby coupled across the coil 15. The relatively high initial voltage across the coil 15 effectuates the desired rapid rise of current through the coil. All things being equal, the application of a larger voltage across the coil will result in a reduced rise time of current through the coil to a given level.

The previously described embodiment is most appropriately employed in applications wherein the drop-out response is not a critical parameter since the dissipation to a storage capacitor generally provides a total dissipation time penalty relative to the dissipation by conventional means. That is to say, versus other known dissipation techniques for the energy in the coil, the storage aspect of the described embodiment tends to increase the time to dissipate the energy in the coil. Therefore, an alternate embodiment of the present invention further advantageous for its attenuation of drop-out response is described below.

Figure 2:
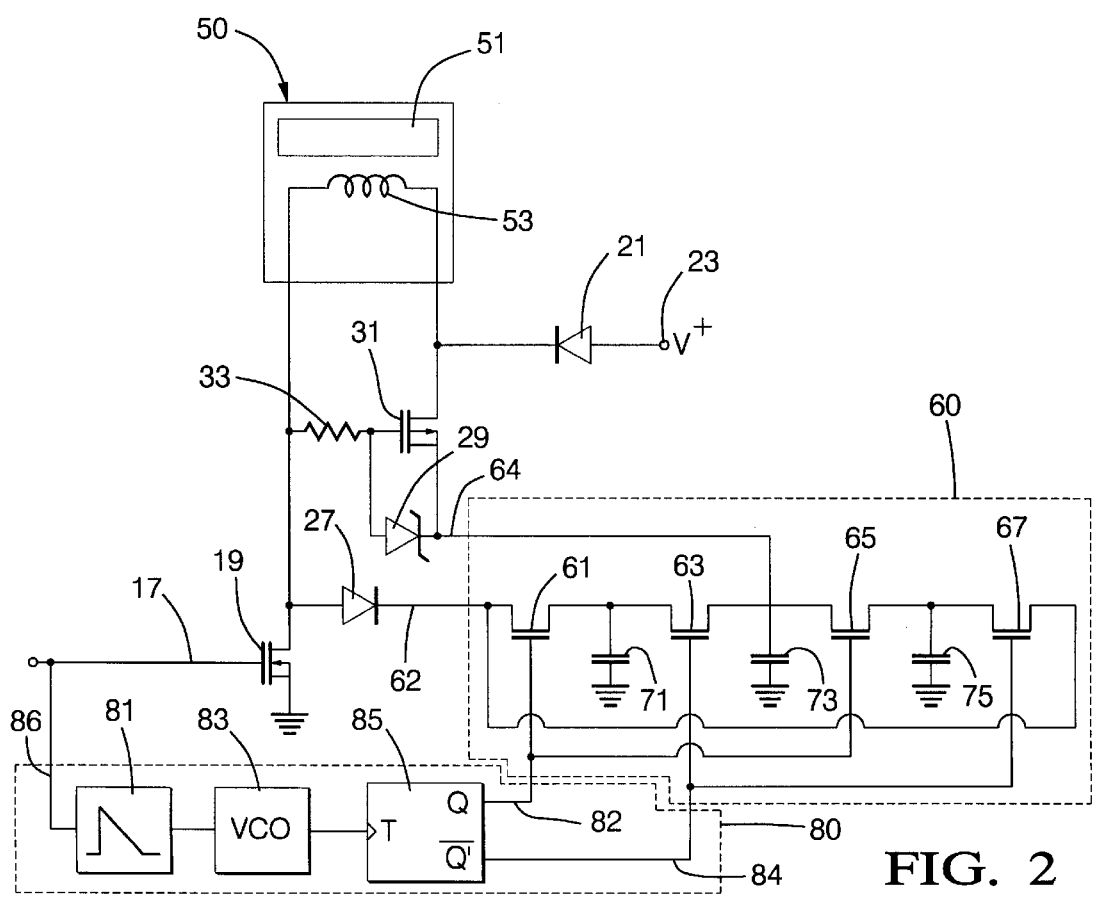
FIG. 2 illustrates a second embodiment of the present invention particularly suited for applications wherein actuator drop-out response is critical; and, FIG. 3 illustrates a third embodiment of the present invention also particularly suited for applications wherein actuator drop-out response is critical.

With reference now to FIG. 2, the pull-in response advantages of the previously described embodiment are complemented, in an alternative embodiment as illustrated, by improvements to the drop-out response of an inductive actuator. Use of numerals in the designation of elements in FIG. 2 which are identical to numerals used in designation of elements of FIG. 1 refer to like elements between the two embodiments. Given that the advantages encompassed by the embodiment illustrated in FIG. 2 are with respect to an inductive actuator of the variety generally benefiting from relatively quick drop-out response, the inductive load illustrated is assumed to be of such variety. Inductively driven actuator 50 is, for example, a pulse width modulated valve such as may be employed as the actuator in a fuel injector. In such an exemplary application, it is imperative that the drop-out response of the actuator be rapid for accurate fuel flow control.

The actuator 50 includes a linearly driven armature 51 which, in the present example, is coupled to an injector valve apparatus (not shown) such as a pintle. The actuator 50 further includes a conventional coil 53 generally energized in unipolar fashion.

Control terminal 17 is coupled to the gate of an N-channel field effect transistor FET 19. The drain of FET 19 is coupled to the ground end of coil 53. The source of FET 19 is coupled to a common ground which, in automotive applications may represent the negative terminal of a DC electrical supply. The supply end of coil 15 is coupled to the cathode of diode 21. The anode of diode 21 is in turn coupled to the positive terminal of the DC electrical supply V+. In the present embodiment, the DC electrical supply is assumed to be a conventional 12 volt automotive system voltage generally limited to less than approximately 14.5 volts.

The control signal supplied to the control terminal 17 provides high and low logic levels of substantially +5 and 0 volts, respectively. High logic levels provided to the control terminal are effective to bias FET 19 conductive thereby coupling coil 53 to ground. Low logic levels provided to the control terminal are effective to bias FET 19 non-conductive thereby decoupling coil 53 from ground.

Capacitive storage network 60 is coupled at a charge acceptance terminal 62 to the cathode of diode 27 and at a charge release terminal 64 to the source of P-channel field effect transistor FET 31 and the cathode of Zener diode 29. The anode of diode 27 is coupled to the drain of FET 19 and the anode of Zener diode 29 is coupled to the gate of FET 31 and one end of bias resistor 33. The other end of bias resistor 33 is coupled to the ground side of coil 53, the anode of diode 27 and the drain of FET 19. The drain of FET 31 is coupled to the junction of the supply side of coil 53 and the cathode of diode 21. Complementary control lines 82 and 84 are also coupled to storage network 60 and provide controlled switching of capacitance during inductive energy reclamation and storage corresponding to device drop-out as will be detailed at a later point in this description. The complementary control lines 82 and 84 provide high and low logic level signals of substantially +5 and 0 volts, respectively.

In the present exemplary embodiment, the signals on lines 82 and 84 are hardware generated by switching circuit generally designated by the numeral 80. Switching circuit 80 includes a T flip-flop 85 whose inverse outputs Q and Q' provide the logic level signals on complementary control lines 82 and 84, respectively. The state changing input, T, is provided by a periodic signal from voltage controlled oscillator VCO 83 which has a frequency proportional to a DC voltage signal at its input and preferably a 50% duty cycle. The DC voltage at the input to the VCO 83 is provided, for example, by ramp generator 81. Ramp generator 81 is negative edge triggered at its input terminal 86 to provide a linearly decreasing DC voltage at its output. The combination of the ramp generator 81, VCO 83, and T flip-flop provides for a duration of increasing period control pulses (decreasing frequency) on lines 82 and 84. While the signal generation on lines 82 and 84 has been described with respect to discrete hardware, it is understood that a variety of software, hardware and hybrid implementations may effectuate the same functions. For example, conventional programmable timers commonly employed in engine control modules may be adapted to provide increasing period control pulses on lines 82 and 84 in response to the control signal supplied on control line 17. As a further example, the linear ramp generator may be displaced in favor of a non-linear ramp generator to more accurately track the charge acceptance and equalization characteristics of the capacitive storage network as will be more fully appreciated from an examination of its operation and function.

The capacitive storage network 60 comprises four solid state switching elements 61, 63, 65, and 67. The network further comprises two intermediate storage capacitors 71 and 75 and a main storage capacitor 73. All three capacitors are coupled at respective low potential ends to ground and at respective high potential ends between respective pairs of switching elements. Furthermore, the main storage capacitor 73 is coupled to charge release terminal 64. The high potential end of intermediate storage capacitor 71 is selectively coupled either to the charge acceptance terminal 62 through closed switching element 61 or to the high potential end of main storage capacitor 73 through switching element 63 in an exclusive OR fashion. This is readily seen by the inverse control signals on lines 82 and 84 which control the states of switch elements 61 and 63, respectively. Similarly, the high potential end of intermediate storage capacitor 75 is selectively coupled either to the charge acceptance terminal 62 through closed switching element 67 or to the high potential end of main storage capacitor 73 through switching element 65 in an exclusive OR fashion. This is readily seen by the inverse control signals on lines 82 and 84 which control the states of switch elements 65 and 67, respectively. It is also noted that the high potential end of main storage capacitor 73 is coupled either to intermediate storage capacitor 71 or to intermediate storage capacitor 75 in an exclusive OR fashion as born out by the inverse relationship of control signals supplied to switching elements 63 and 65. It also follows that the respective high potential end of only one of the intermediate storage capacitors 71 and 75 may be coupled to the charge acceptance terminal 62 in an exclusive OR fashion as born out by the inverse relationship of control signals supplied to switching elements 61 and 67. Therefore, one state of T flip-flop 85 couples the high potential end of intermediate storage capacitor 71 to charge acceptance terminal 62 and the high potential end of intermediate capacitor 75 to the high potential end of main storage capacitor 73. The other state of T flip-flop 85 couples the high potential end of intermediate storage capacitor 75 to charge acceptance terminal 62 and the high potential end of intermediate capacitor 71 to the high potential end of main storage capacitor 73. The intermediate storage capacitors are essentially interchanged with respect to their electrical positions in the capacitive storage network 60 in accordance with the changing state of T flip-flop 85.

In one example, a linear actuator having a coil characterized by a nominal inductance of approximately 2 mH, intermediate storage capacitors characterized by a nominal capacitance of 10 nF and a voltage rating of 150 volts, and a main storage capacitor characterized by a nominal capacitance of 700 nF and a voltage rating of 150 volts, provided the nominal working values of the reactive components in the circuit described above.

The exemplary circuit set forth above operates as follows. Assuming a substantially steady state energization of coil 53 corresponding to a high logic signal at control terminal 17, an amount of energy is understood to be stored in the coil 53. The steady state of the coil is generally understood to mean that the characteristic transient response of the inductor to energization is passed and the current therethrough is substantially stabilized at a value in accord with the forced response of the coil. The amount of energy in this steady state condition is well known to be substantially $\frac{1}{2}*Li^2$ where L is the inductance of the coil 15, and i is the steady state current therethrough. The steady state current may alternately be expressed as v/R where v is the voltage applied across the coil 15 and R is the resistive component of the coil impedance. The value for v in the present example is approximated by supply voltage V+. Additionally, main storage capacitor 73 is assumed to be substantially discharged to approximately supply voltage V+. FET 31 is in a biased on condition since the gate thereof is pulled down to substantially ground potential through bias resistor 33 and FET 19, and the source is at substantially supply voltage V+. Therefore, the gate is low with respect to the source and P-channel FET 31 biased on.

Assuming now that the control signal at control terminal 17 is switched to a low logic level, indicating the desirability of device drop-out, FET 19 is biased off. The falling edge of the control signal is also seen by input terminal 86 of ramp generator 81 to trigger the provision of increasing period control pulses on lines 82 and 84. The current through the coil 53 cannot instantaneously change and hence is routed through diode 27 and to the one of intermediate storage capacitors 71 or 75 that is coupled to the cathode of diode 27 by way of charge acceptance terminal 62 and respective associated switching element 61 or 67. The voltage across the coil rises as the current therethrough is restricted and is influenced by the charge acceptance of the intermediate storage capacitor 71 or 75 coupled thereto. The T flip-flop 85 changes state so that the intermediate storage capacitor previously coupled to the charge acceptance terminal is now coupled to the main storage capacitor 73 and the accumulated charge of the higher voltage intermediate storage capacitor migrates to the main storage capacitor thus reducing the intermediate storage capacitor voltage and raising the main storage capacitor voltage to an equalized level in accordance with the total parallel capacitance of the two capacitors. The other intermediate storage capacitor previously coupled to the main storage capacitor 73 and having since been coupled to charge acceptance terminal 62 shunts the ground end of coil 53 to substantially the voltage across the intermediate storage capacitor. The voltage across the coil rises again as the current therethrough decays and is influenced by the charge acceptance of the intermediate storage capacitor coupled thereto. Once again, the T flip-flop 85 changes state to interchange the electrical positions of the intermediate storage capacitors to thereby migrate the charge from the higher voltage intermediate storage capacitor to the lower voltage main storage capacitor 73, and recharge the other intermediate storage capacitor from the coil current. As the process is repeated, the average voltage at the ground end of the coil 53 is maintained at a substantially higher level for shorter coil dissipation time than would be the case where the main storage capacitor is presented directly to the charge acceptance terminal.

As the main storage capacitor continues to receive charge from the intermediate storage capacitors, the voltage rises and presents an increasing equalization level to the intermediate capacitors. Hence, the initial voltage at the high potential side of the intermediate storage capacitors at the beginning of each successive cycle is greater than the previous initial voltage, and the equalization voltage at the end of each successive cycle is greater than the previous equalization voltage. The charge and discharge of the intermediate capacitors are known to be functions of the RC time constant profile. More particularly, since the intermediate storage capacitors are charging to a voltage with respect to ground, higher initial voltages across the intermediate storage capacitors require longer charge durations to reach a given voltage. Similarly, since the intermediate storage capacitors are discharging to a voltage having increasing potential with respect to ground, lower differential voltages between the intermediate and main storage capacitors require longer discharge durations to reach the equalization voltage. As the cycles of charge and discharge progress, the effective region of the RC time constant profile also changes as suggested. It is desirable, therefore, to generally progressively increase the period of the control pulses (decrease their frequency) to adapt the duration with which each intermediate storage capacitor is coupled to the charge acceptance terminal to receive charge and similarly with which each is coupled to the main storage capacitor for charge equalization. The linear ramp generator earlier described exemplifies one simplistic approach approximating the RC time constant profile. As mentioned, a non-linear ramp generator may be substituted to more closely approximate the RC time constant profile in such an open-loop control as exemplified in the embodiment of FIG. 2. At the point where the current through the coil 53 decays to zero, the voltage at the ground end of the coil 53 drops to substantially supply voltage.

The control signal may now be applied to the control terminal 17 at a high logic level to energize the coil 53. The turn-on of FET 19 occasioned by the high logic level control signal pulls the ground end of the coil to ground potential which, as earlier indicated, effectuates the biasing of FET 31 on due to the low gate voltage relative to the source voltage. The main storage capacitor 73 is thereby coupled to the supply end of the coil 53 through FET 31. Diode 21 is reverse biased and the voltage across the storage capacitor 53 is thereby coupled across the coil 53. The relatively high initial voltage across the coil 53 effectuates the desired rapid rise of current through the coil. All things being equal, the application of a larger voltage across the coil will result in a reduced rise time of current through the coil to a given level.

With the exemplary values for a linear actuator in combination with a capacitive storage network given above, a fully charged main storage capacitor voltage of substantially 67 volts was attained in substantially 500 microseconds with a beginning control signal frequency on lines 82 and 84 of substantially 100 kHz, and an end frequency of substantially 90 kHz. Maximum peak intermediate storage capacitor voltages of substantially 125 volts were attained which correspond to the maximum peak voltage attained at the ground end of the coil.

Figure 3:
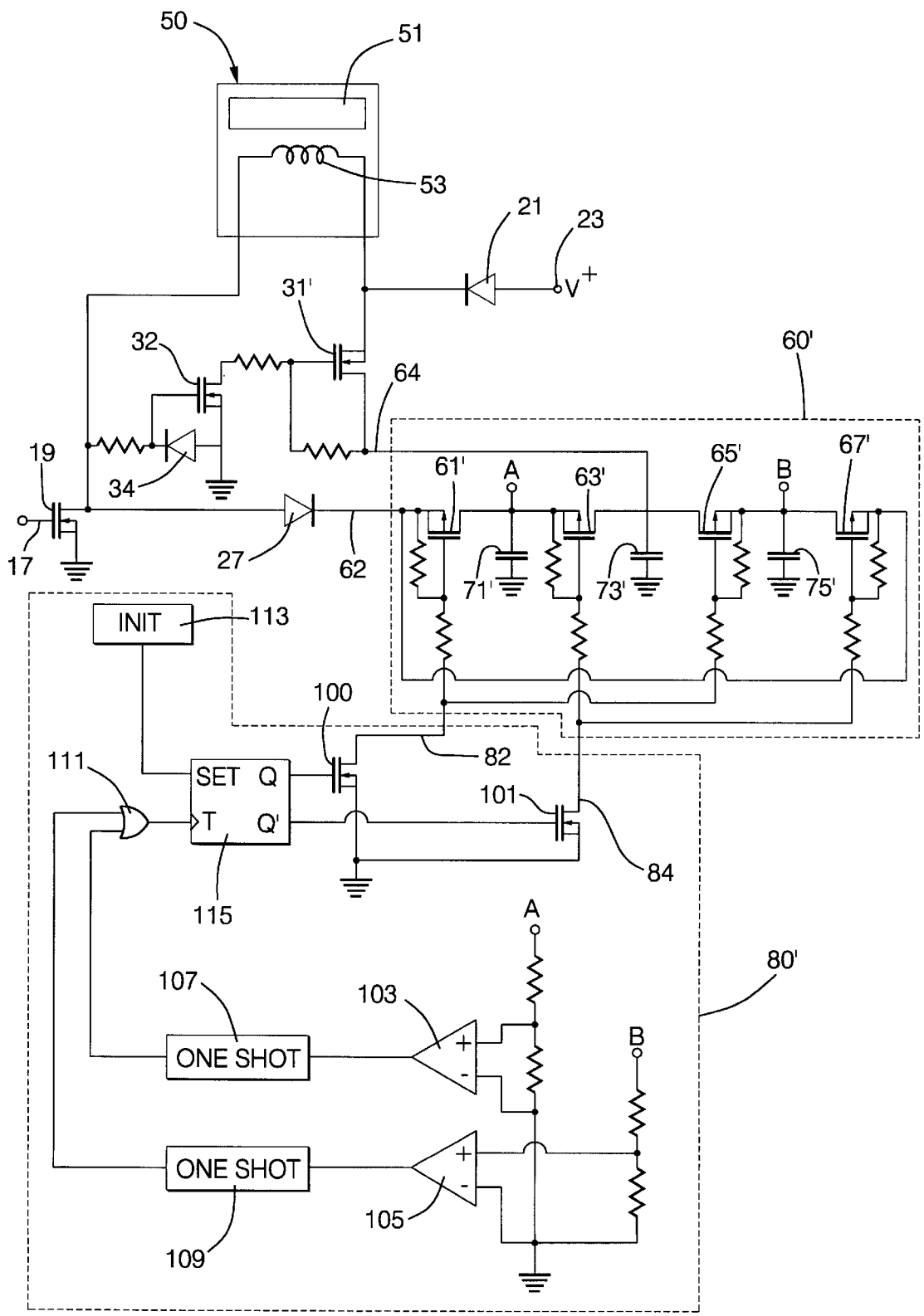

With reference now to FIG. 3, an alternative and preferred embodiment providing the pull-in and drop-out response advantages is set forth. The charge storage and reclamation objectives of the circuit shown in FIG. 3 remain unchanged. The circuit of FIG. 3, however, includes a closed-loop control of the capacitive storage network. Use of numerals in the designation of elements in FIG. 3 which are identical to numerals used in designation of elements of FIGS. 1 and 2 refer to like elements between the various embodiments. Use of primed numerals in the designation of elements in FIG. 3 corresponding to non-primed numerals used in designation of elements of FIG. 2 refer to functionally analogous elements between FIGS. 1 and 2 embodiments. For brevity, like elements previously described will not have descriptions repeated, and functionally analogous elements will only be described in such further detail as may be warranted by the greater detail shown.

Capacitive storage network 60' is coupled at a charge acceptance terminal 62 to the cathode of diode 27 and at a charge release terminal 64 to the drain of N-channel field effect transistor FET 31'. The source of FET 31' is coupled to the junction of the supply side of coil 53 and the cathode of diode 21. The gate of FET 31' is coupled to an isolation stage comprising N-channel field effect transistor 32 and diode 34. The gate of FET 32 is in turn coupled to the drain of FET 19. When FET 19 is biased conductive due to a device energization command of a high logic level on line 17, FET 32 is biased non-conductive and FET 31' is biased conductive. Similarly, when FET 19 is biased non-conductive due to a device deenergization command of a low logic level on line 17, FET 32 is biased conductive and FET 31' is biased non-conductive. Therefore, the charge release terminal 64 is coupled to the supply side of coil 53 at coil energization and decoupled therefrom at coil deenergization. Diode 34 blocks the shunting of inductor current to ground at deenergization of the coil.

Complementary control lines 82 and 84 are also coupled to storage network 60' and provide controlled switching of capacitance during inductive energy reclamation and storage corresponding to device drop-out.

In the preferred embodiment presently being described, the signals on lines 82 and 84 are also hardware generated by switching circuit generally designated by the numeral 80'. Switching circuit 80' operates in closed-loop fashion by monitoring the respective voltages at each of the intermediate capacitors 71' and 75' and providing the appropriate switching signals upon the one of the intermediate capacitors being charged attaining a predetermined threshold.

Switching circuit 80' has a pair of input terminals labeled A and B which correspond to similarly labeled points in the capacitive storage network 60'. Points A and B in the capacitive storage network couple directly to respective high potential ends of intermediate storage capacitors 71' and 75'. The input voltages at A and B are scaled down through high impedance voltage dividers to provide voltage signals to the non-inverting input of comparators 103 and 105. The inverting inputs of the comparators are coupled to ground. Each comparator 103 and 105 is of the variety capable of internally set threshold levels through appropriate external pin selections as well known to those skilled in the art. In the present embodiment, the internally set threshold is substantially regulated supply voltage. Each voltage divider is therefore calibrated to provide a scaled voltage input to the non-inverting input of substantially regulated supply voltage when the respective intermediate capacitor voltage attains the voltage whereat switching in desired. This voltage is desirably equivalent to a voltage substantially above the limited system voltage yet below the voltage rating of the capacitive elements.

The comparators have respective outputs to self resetting one-shots 107 and 109 which in the present configuration are positive edge triggered to output a pulse upon the respective one of the comparators detecting the voltage threshold condition at the corresponding intermediate capacitor. The one shots respective outputs are passed through OR gate 111 to the state changing input, T, of T flip-flop 115 whose inverse outputs Q and Q' provide logic level signals to isolation stage signal-inverting FETs 100 and 101. The drain of each FET 100 and 101 is coupled to a respective one of complementary control lines 82 and 84, respectively. T flip-flop is initialized to ensure appropriate complementary states at the outputs by initialization circuit 113 providing a set pulse thereto when the circuit is powered up. Initialization circuit 113 may take the form of a non-resettable one-shot or other equivalent well known alternative.

The triggering of the T flip-flop 115 at predetermined intermediate capacitor voltage thresholds effectively provides for a duration of increasing period control pulses (decreasing frequency) on lines 82 and 84 in closed-loop fashion which directly tracks the RC time constant profile. Hence, approximation of the RC time constant as described with respect to the open loop embodiment of FIG. 2 is displaced in favor of the more accurate present closed-loop embodiment of FIG. 3.

The capacitive storage network 60' comprises four P-channel FETs 61', 63', 65', and 67' and corresponding conventional bias resistor networks appropriately calibrated to ensure that the gate to source voltage differential limits of the FET are not exceeded.

While the invention has been described with respect to a variety of embodiments, it is anticipated that certain modifications may be apparent to one having ordinary skill in the art. Therefore, the examples detailed herein are understood to be exemplary of and not limiting to the scope of the invention as set forth in the appended claims.

We claim:

1. An apparatus for reducing the response time of an armature of an electromechanical actuator driven by magnetic force provided by an electrical coil in a system having a DC supply voltage relative to a system ground and substantially limited to a predetermined voltage, comprising:
    a charge storage device having a first end coupled to the system ground and a second end;
    a first diode with its anode coupled to the DC supply voltage and its cathode directly coupled to a first end of the electrical coil;
    a first switch coupled between a second end of the electrical coil and the system ground;
    a second diode with its anode coupled to the second end of the electrical coil and its cathode coupled to the second end of the charge storage device; and
    a second switch coupled directly between the first end of the electrical coil and the second end of the charge storage device;
    wherein during simultaneous closure of the switches the charge storage device discharges through the electrical coil and during simultaneous opening of the switches the electrical coil charges the charge storage device.

2. An apparatus as claimed in claim 1 wherein the charge storage device comprises a storage capacitor.

3. An apparatus for reducing the response time of an armature of an electromechanical actuator driven by magnetic force provided by an electrical coil in a system having a DC supply voltage relative to a system ground and substantially limited to a predetermined voltage, comprising:
    a main charge storage device and a pair of intermediate charge storage devices:
    a circuit adapted to alternately charge each of the pair of intermediate charge storage devices to voltages greater than the DC supply voltage from the electrical coil current subsequent to deenergization of the electrical coil and to alternately discharge each of the pair of intermediate charge storage devices to the main charge storage device subsequent to deenergization of the electrical coil,
    wherein when one of the pair of intermediate charge storage devices is being charged by the electrical coil current the other of the pair of intermediate charge storage devices is being discharged to the main charge storage device.

4. An apparatus as claimed in claim 3 wherein the circuit comprises voltage sensing means for sensing the voltage at each of the intermediate charge storage devices, the circuit being responsive to the voltage sensing means to alternate the intermediate charge storage devices between charging from the electrical coil and discharging to the main charge storage device when the one of the intermediate charge storage devices being charged from the electrical coil reaches a predetermined voltage.

5. An apparatus as claimed in claim 4 wherein said circuit is further adapted to discharge the main charge storage device through the electrical coil upon energization of the electrical coil.

6. An apparatus as claimed in claim 3 wherein said circuit is further adapted to discharge the main charge storage device through the electrical coil upon energization of the electrical coil.

7. A method for reducing the response time of an armature of an electromechanical actuator driven by magnetic force provided by an electrical coil in a system having a DC supply voltage relative to a system ground and substantially limited to a predetermined voltage, the method comprising the steps:

energizing the electrical coil;

deenergizing the electrical coil to induce a voltage across the coil;

subsequent to deenergizing the electrical coil, alternately charging each of a pair of intermediate charge storage devices to voltages greater than the DC supply voltage from electrical coil current and alternately discharging each of the pair of intermediate charge storage devices to a main charge storage device to thereby establish the voltage of the main charge storage device greater than the DC system voltage, wherein when one of the pair of intermediate charge storage devices is being charged by the electrical coil current the other of the pair of intermediate charge storage devices is being discharged to the main charge storage device.

8. The method for reducing the response time of an armature of an electromechanical actuator as claimed in claim 7 wherein the charging of each of the intermediate storage devices continues until a predetermined voltage is reached whereafter the charged intermediate storage device is discharged to the main charge storage device.

9. The method for reducing the response time of an armature of an electromechanical actuator as claimed in claim 8 further comprising the step of:

discharging the main charge storage device through the electrical coil upon energizing the electrical coil.

10. The method for reducing the response time of an armature of an electromechanical actuator as claimed in claim 7 further comprising the step of:

discharging the main charge storage device through the electrical coil upon energizing the electrical coil.

* * * * *